United States Patent [19]

Miavecz

[11] 4,087,807

[45] May 2, 1978

[54] WRITE PULSE WAVE FORM FOR OPERATING GAS DISCHARGE DEVICE

[75] Inventor: Joseph L. Miavecz, Sylvania, Ohio

[73] Assignee: Owens-Illinois, Inc., Toledo, Ohio

[21] Appl. No.: 657,494

[22] Filed: Feb. 12, 1976

[51] Int. Cl.[2] .................... G06F 3/14

[52] U.S. Cl. .................... 340/324 M; 315/169 TV; 365/116

[58] Field of Search .......... 340/173 PL, 324 M, 343; 315/169 TV, 169 R

[56] References Cited

U.S. PATENT DOCUMENTS

| | | | |
|---|---|---|---|
| 3,686,686 | 8/1972 | Hall | 340/324 M |
| 3,727,102 | 4/1973 | Johnson | 315/169 R |
| 3,833,832 | 9/1974 | Fein et al. | 340/324 M |

*Primary Examiner*—Marshall M. Curtis
*Attorney, Agent, or Firm*—Donald Keith Wedding

[57] ABSTRACT

A gas discharge device having at least one dielectric charge storage member the gaseous medium contacting surface of which consists of a low operating voltage material. The material is used in an amount sufficient to increase the operating life span of the device and/or stabilize the operating voltages of the device. An interface and addressing means is connected to a pair of opposed electrode arrays to energize a plurality of discharge cells, each cell including proximate electrode portions of at least one electrode in each opposed array, said dielectric charge storage member insulating at least one of said proximate electrode portions from said gas. A cell and associated circuitry present a capacitive impedance to a voltage pulse applied by the interface and addressing means to the electrode portions to generate a relatively slow rise time leading edge on said voltage pulse for improved addressing of said cell. The addressing of the cell is further improved by turning on a keyer pulser near the end of the voltage pulse to generate a relatively fast rise time leading edge increased magnitude portion on the voltage pulse.

15 Claims, 9 Drawing Figures

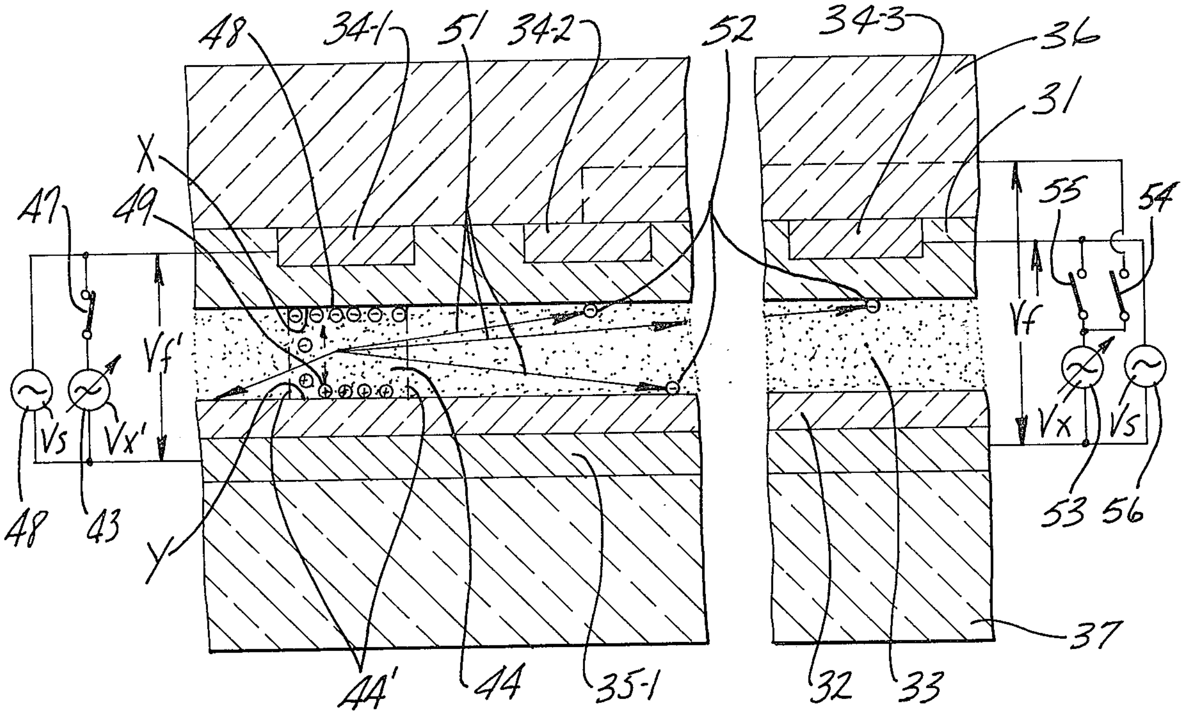
FIG. 5
FIG. 6
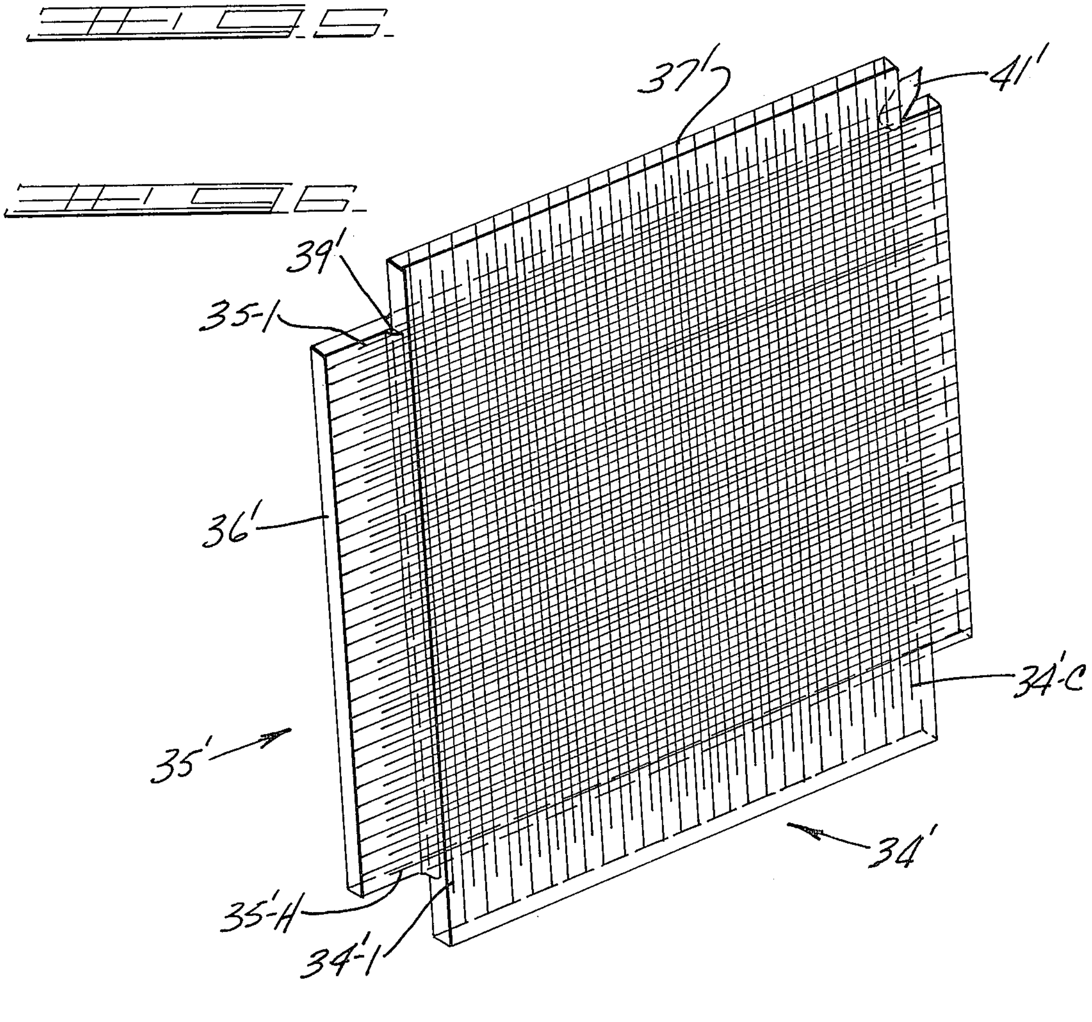

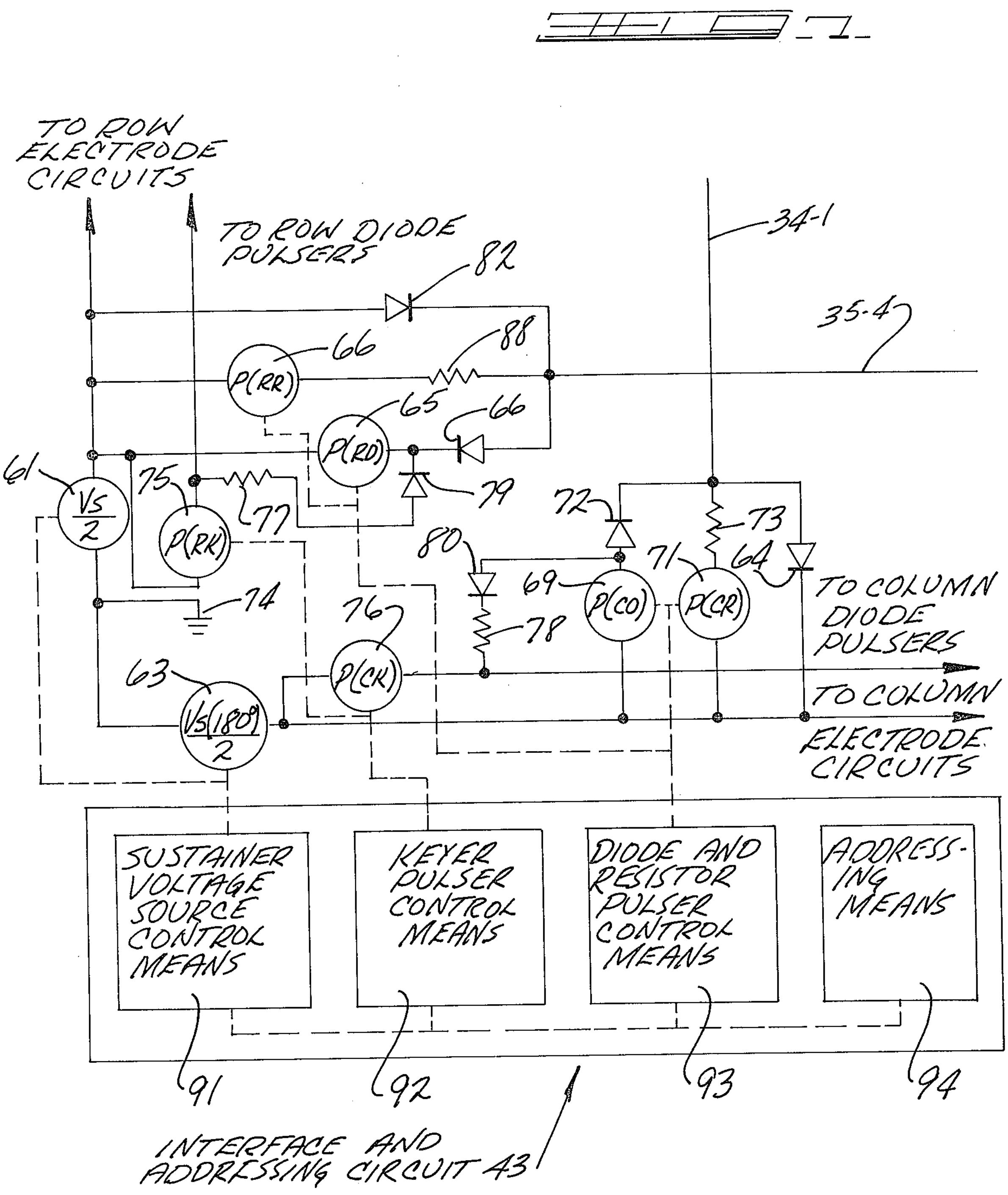
TO ROW ELECTRODE CIRCUITS
TO ROW DIODE PULSERS
82
34-1
35-4
66
P(RR)
88
65
66
P(RD)
61
Vs/2
75
P(RK)
77
79
72
73
80
71
64
74
69
P(CO)
P(CR)
TO COLUMN DIODE PULSERS
76
P(CK)
78
63
Vs(180°)/2
TO COLUMN ELECTRODE CIRCUITS
SUSTAINER VOLTAGE SOURCE CONTROL MEANS
KEYER PULSER CONTROL MEANS
DIODE AND RESISTOR PULSER CONTROL MEANS
ADDRESSING MEANS
91
92
93
94
INTERFACE AND ADDRESSING CIRCUIT 43

WRITE PULSE WAVE FORM FOR OPERATING GAS DISCHARGE DEVICE

BACKGROUND OF THE INVENTION

1. Field Of The Invention

This invention relates to wave forms for controlling gas discharge devices, especially multiple gas discharge display/memory devices which have an electrical memory and which are capable of producing a visual display or representation of data.

2. Description Of The Prior Art

Heretofore, multiple gas discharge display and/or memory panels have been proposed in the form of a pair of dielectric charge storage members which are backed by electrodes, the electrodes being so formed and oriented with respect to an ionizable gaseous medium as to define a plurality of discrete gas discharge units or cells. The cells have been defined by a surrounding or confining physical structure such as the walls of apertures in a perforated glass plate sandwiched between glass surfaces and they have been defined in an open space between glass or other dielectric backed with conductive electrode surfaces by appropriate choices of the gaseous medium, its pressure and the electrode geometry. In either structure, charges (electrons and ions) produced upon ionization of the gas volume of a selected discharge cell, when proper alternating operating voltages are applied between the opposed electrodes, are collected upon the surface of the dielectric at specifically defined locations. These charges constitute an electrical field opposing the electrical field which created them so as to reduce the voltage and terminate the discharge for the remainder of the cycle portion during which the discharge producing polarity remains applied. These collected charges aid an applied voltage of the polarity opposite that which created them in the initiation of a discharge by imposing a total voltage across the gas sufficient to again initiate a discharge and a collection of charges. This repetitive and alternating charge collection and ionization discharge constitutes as electrical memory.

An example of a panel structure containing non-physically isolated or open discharge cells is disclosed in U.S. Pat. No. 3,499,167 issued to Theodore C. Baker, et al. Physically isolated cells have been disclosed in the article by D. L. Bitzer and H. G. Slottow entitled "The Plasma Display Panel - A Digitally Addressable Display With Inherent Memory" Proceeding of the Fall Joint Computer Conference, I E E E , San Francisco, Cal., Nov. 1966, pp 541 - 547 and in U.S. Pat. No. 3,559,190.

One construction of a memory/display panel includes a continuous volume of ionizable gas confined between a pair of dielectric surfaces backed by conductor arrays, typically in parallel lines with the arrays of lines orthogonally related, to define, in the region of the projected intersections as viewed along the common perpendicular to each array, a plurality of opposed pairs of charge storage areas on the surfaces of the dielectric bounding or confining the gas. Many variations of the individual conductor form, the array form, their relationship to each other and to the dielectric and gas are available, hence the orthogonally related, parallel line arrays which are discussed herein are merely illustrative.

In prior art, a wide variety of gases and gas mixtures have been utilized as the ionizable gaseous medium, it being desirable that the gas provide a copious supply of charges during discharge, be inert to the materials with which it came in contact, and where a visual display is desired, be one which produces a visible light or radiation which stimulates a phosphor. Preferred embodiments of the display panel have utilized at least one rare gas, more preferably at least two, selected from helium, neon, argon, krypton or xenon.

In the operation of the display/memory device an alternating voltage is applied, typically, by applying a first periodic voltage wave form to one array and applying a cooperating second wave form, frequency identical to and shifted on the time axis with respect to the first wave form, to the opposed array to impose a voltage across the cells formed by the opposed arrays of electrodes which is the algebraic sum of the first and second wave forms. The cells have a voltage at which a discharge is initiated. That voltage can be derived from an externally applied voltage or a combination of wall charge potential and an externally applied voltage. Ordinarily, the entire cell array is excited by an alternating voltage which, by itself, is of insufficient magnitude to ignite gas discharges in any of the elements. When the walls are appropriately charged, as by means of a previous discharge, the voltage applied across the element will be augmented, and a new discharge will be ignited. Electrons and ions again flow to the dielectric walls extinguishing the discharge; however, on the following half cycle, their resultant wall charges again augment the applied external voltage and cause a discharge in the opposite direction. The sequence of electrical discharges is sustained by an alternating voltage signal that, by itself, could nor initiate that sequence. The half amplitude of this sustaining voltage has been designated $Vs/2$.

In addition to the sustaining voltage there are manipulating voltages or addressing voltages imposed on the opposed electrodes of a selected cell or cells to alter the state of those cells selectively. One such voltage, termed a "writing voltage", transfer a cell or discharge site from the quiescent to the discharging state by virtue of a total applied voltage across the cell sufficient to make it probable that on subsequent sustaining voltage half cycles the cell will be in the "on state". A cell in the "on state" can be manipulated by an addressing voltage, termed an "erase voltage", which transfers it to the "off state" by imposing sufficient voltage to draw off the surface or wall charges on the cell walls and cause them to discharge without being collected on the opposite cell walls in an amount such that succeeding sustainer voltage transitions are not augmented sufficiently by wall charges to ignite discharges.

A common method of producing writing voltages is to superimpose voltage pulses on a sustainer wave form in an aiding direction and cumulatively with the sustainer voltage, the combination having a potential of enough magnitude to fire an "off state" cell into the "on state". Erase voltages are produced by superimposing voltage pulses on a sustainer wave form in opposition to the sustainer voltage to develop a potential sufficient to cause a discharge in an "on state" cell and draw the charges from the dielectric surfaces such that the cell will be in the "off state". The wall voltage of a discharged cell is termed an "off state wall voltage" and frequency is midway between the extreme magnitude limits of the sustainer voltage Vs.

The stability characteristics and non-linear switching properties of these bistable cells are such that, in the case of a cell which has not fired in the preceding half cycle of sustaining voltage, the state of such cell in the cell array can be changed by selective application of an external voltage which exceeds the firing or discharge igniting potential. In the case of a cell which has been fired in the preceding half cycle and has accumulated charges which can aid the sustaining voltage, the cell can be turned off by applying a voltage which discharges the cell. These manipulating signals are applied in a timed relationship with the alternating sustaining voltage, and through control of discharge intensity, accomplish selective state transitions by changing the wall voltage of only the cell being addressed.

Cells are transferred to the "on state" by applying a portion of the manipulating signal superimposed on the sustaining voltage, termed a "select signal", on each of two opposed electrode portions which are proximate the cell. Conventionally, like sustaining signals are imposed on each electrode array so that half the sustaining voltage is imposed on each array and half the select signal is imposed on the addressed cell electrode in each electrode array at a time when the sum of the applied voltages is sufficient to ignite a discharge. Further, the partial select signals on each electrode are limited to a value which will not impose a firing potential across other cells defined by that electrode and not selected. A typical write signal for a cell is developed by applying half select voltages to the addressed electrodes of the cell to be placed in the "on state" at a time the sustaining voltages are developing a pedestal potential somewhat below the maximum sustaining voltage. Typically a write signal is imposed on each opposed electrode portion of the cell during the terminal portion of a sustain voltage half cycle when any wall charging which may result from the prior sustainer transient is substantially completed. The manipulating signal thus ignites a single, and unique, cell at the intersection of the selected two opposed electrodes. This ignited discharge thus establishes the cell in the "state" since a quanity of charge is stored in the cell such that, on each succeeding half cycle of the sustaining voltage, a gaseous discharge will be produced.

In order to erase a cell or transfer it to the "off state", the charge stored in the cell is discharged at a time when the sustaining voltage is imposing a voltage in opposition to the wall charge voltage. As for writing, the erase manipulation is facilitated if the sustaining voltage is at a pedestal level below the level providing the maximum applied voltage so that the erase half select voltages are at a convenient level. Typically, an erase signal is imposed on each opposed electrode portion of the cell during the terminal portion of a sustain voltage half cycle, when the wall charging from the prior sustainer discharge is substantially completed, but preceding the next half cycle alternation by enough time so that the wall discharge of the selected cell is substantially stabilized.

Circuitry for sustaining voltages, and where employed, their pedestal and for the manipulating voltages for writing and erasing individual cells can be quite extensive.

Transformer coupling of manipulating signals to the electrodes of multiple gas discharge display/memory devices has been disclosed in William E. Johnson et al. U.S. Pat. No. 3,618,071 for "Interfacing Circuitry and Method for Multiple - Discharge Gasous Display and/or Memory Panels" which issued Nov. 2, 1971. The coupling of individual electrodes in large arrays involving substantial numbers of electrodes is cumbersome and expensive. Accordingly, solid-state pulser circuits capable of feeding through the sustaining voltage were proposed as exemplified in William E. Johnson U.S. Pat. No. 3,611,296 of Oct. 5, 1971 for "Driving Circuitry For Gas Discharge Panel". Multiplexing of the signals to the electrodes in an array has been utilized employing combinations of diode and resistor pulsers to manipulate cell potentials as shown in U.S. Pat. No. 3,864,918 issued Aug. 15, 1972 to Larry J. Schmersal for "Gas Discharge Display/Memory Panels and Selection and Addressing Circuits Therefore".

It previously had been discovered that the operating characteristics uniformity and operating life span of a multiple cell gaseous discharge display/memory device can be increased by utilizing a charge storage member with a gas medium contact surface consisting of at least one member selected from oxides of Be, Mg, Ca, Sr, Ba, or Ra. As used herein the gas medium contacting surface is that portion of the dielectric charge storage member which is in direct contact with the ionizable gas medium. Although it is not known whether the charges are stored on the gas contacting surface or sub-surface of the dielectric, the charges at least originate at such surface.

In another embodiment, the entire dielectric body consists of a Group IIA oxide. In another embodiment, a continuous or discontinuous layer or film of a Group IIA oxide is applied to the gaseous medium contacting surface portion of the dielectric body.

In such latter embodiment, the oxide layer may be formed in situ on the dielectric surface, e.g., by applying the elemental Group IIA (or a source thereof) to the dielectric surface followed by oxidation. One such in situ process comprises applying a melt to the dielectric followed by oxidation of the melt during the cooling thereof so as to form the oxide layer. Another in situ process comprises applying an oxidizable source of the Group IIA element to the surface. Typical oxidizable sources include minerals and/or compounds containing the appropriate Group IIA element, especially organic compounds which are readily heat decomposed or pyrolyzed.

Typically, the Group IIA oxide layer (or a source thereof) is applied directly to the dielectric surface by any convienient means including not by way of limitation: vapor deposition; vacuum deposition; chemical vapor deposition; wet spraying upon the surface a mixture of solution of the oxide suspended or dissolved in a liquid followed by evaporation of the liquid; dry spraying of the oxide upon the surface; electron beam evaporation; plasma flame and/or arc spraying and/or deposition; and sputtering target techniques.

The Group IIA oxide is applied to (or formed in situ on) the dielectric surface as a very thin continuous or dicontinuous film or layer, the thickness and amount of the oxide layer being sufficient to increase the operating characteristics uniformity ( such as stablization of operating voltages) and/or operating life span of the device. In the usual practice hereof, the oxide layer is applied to or formed on the dielectric material surface to a thickness of at least about 200 angstrom units with a range of about 200 angstrom units up to about 1 micron (10,000 angstrom units). When the entire dielectric consists of a Group IIA oxide, the dielectric Group IIA oxide thickness may range up to 25 microns or more. As used herein, the terms "film" or "layer" are intended to be all inclusive of other similar terms such as deposit, coating, finish, spread, covering, etc.

In the fabrication of a gaseous discharge panel, the dielectric material is typically applied to and cured on the surface of a supporting glass substrate or base to which the electrode or conductor elements have been previously applied. The glass substrate may be of any suitable composition such as soda lime glass composition. In a Baker et al. device two glass substrates containing electrodes and cured dielectric are then appropiately heat sealed together so as to form a panel.

In order to achieve maximum results, the Group IIA oxide layer is continuously or discontinuously applied to the gaseous medium contacting surface of the dielectric. In other words, the applied Group IIA oxide layer must be directy exposed to the gaseous medium in order to achieve the desired results.

Other metal or metalloid oxide layers may exist below that of the Group IIA oxide layer. Such sub-layers may be of any suitable oxide of the periodic table, especially aluminum oxide, silicon oxide and the rare earth oxides. Also, as already noted hereinbefore, another embodiment of this invention comprises using a dielectric which consists of Group IIA oxide.

SUMMARY

The present invention concerns the operation of a multicelled gas discharge display/memory device having at least one dielectric charge storage member with a low operating voltage gaseous medium contacting surface. The surface is typically formed of at least one Group IIA oxide used in an amount sufficient to increase the operating life span of the device and/or stabilize the operating voltages of the device. An interface and addressing circuit is connected to a pair of opposed electrode arrays to energize a plurality of discharge cells, each cell including proximate electrode portions of at least one electrode in each opposed array, the dielectric charge storage member insulating one of the proximate electrode portions from the gas.

The interface and addressing circuit includes sustainer voltage sources for maintaining a series of discharges in a cell and a pulser-resistor-diode matrix for writing and erasing selected cells. Since the cells present a capacitive impedance to be interface and addressing circuit, keyer pulsers are included to generate a steeply rising leading edge on the write and erase pulses. However, where the low voltage dielectric surface is utilized, the steeply rising write pulses tend to generate crosstalk, that is turn on cells adjacent to the selected cell.

In accordance with the present invention, the keyer pulsers are turned off when the write pulses are generated. The write pulses are then subjected to the capacitive impedance of the cells and associated circuits to generate a slow rise time leading edge. Near the end of the write pulse the keyer pulsers are turned on to generate a relatively fast rise time leading edge increased magnitude portion on the voltage pulse. Such write pulses tend to decrease or eliminate crosstalk in the device. In addition, the slow rise time write pulses increase the size of the window, the pulser-sustainer voltage combinations which result in satisfactory operation of the device. An increase in the duration of the write pulse in conjunction with the slow rise time of that pulse may be utilized to further improve the reliability of the selective manipulation of the charge state of individual cells.

An object of the present invention is to facilitate the control of a multiple gas discharge display/memory device for the manipulation of cell states.

Another object of the present invention is to optimize the dynamic wave forms applied to multicelled gas discharge display/memory devices.

A further object of the present inventionis to improve the performance of and increase the tolerance to geometric non-uniformities of reduced firing voltage multicelled gas discharge display/memory devices.

Another object is to achieve more reliable operation of multicelled gas discharge display/memory devices with respect to the selective manipulation of the charge state of individual cells.

BRIEF DESCRIPTION OF THE DRAWINGS

FIG. 5 is an explanatory partial cross-sectional view similar to FIG. 4 (enlarged, but not to proportional scale);

FIG. 6 is an isometric view of a gas discharge display/memory panel;

FIG. 7 is a schematic representation of the interface and addressing circuit of FIG. 3;

FIG. 8 is a modified sustaining voltage wave form and an extended write pulse according to the present invention plotted against the time scale of FIGS. 1 and 2;

DESCRIPTION OF THE PREFERRED EMBODIMENT

Figure 1:
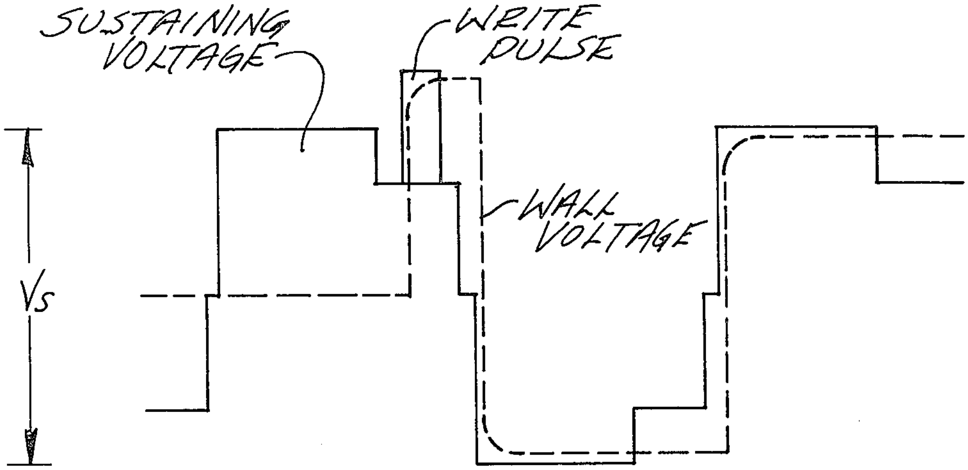
FIG. 1 PRIOR ART
FIG. 1 is a generalized prior art sustaining voltage wave form and write pulse plotted against time.

There is shown in FIG. 1 the prior art wave forms associated with the bistable operation of a gas discharge cell. The applied voltage wave form shows a sustaining voltage V*s* which is continuously applied to all cells or sites on a panel. The magnitude of the sustaining voltage is insufficient to cause any discharge sites to turn on (i.e. to initiate a stable sequence of discharges), but is sufficient to sustain a discharge sequence once the sequence has been initiated by a "write" pulse applied to the selected site. The magnitude of the "write" pulse must exceed the firing potential of the site and can be applied between the alternate half cycles of the sustaining voltage, superimposed on a half cycle or superimposed on a pedestal as shown in FIG. 1. The utilization of the pedestal with the sustaining voltage wave form allows the use of a smaller magnitude write pulse which can be generated by less expensive electronics.

Because the conducting electrodes are separated from the discharge by a thin layer of insulating dielectric material, the gas discharges occur as short pulses. As the discharge current flows, the electrons and ions accumulate on the insulating surfaces producing an electric field which opposes the field which caused breakdown. The voltage due to these charges on the walls is called the wall voltage. When the polarity of the applied voltage changes, the wall voltage adds to the applied voltage thus producing another discharge pulse. This process repeates every half cycle producing a sequence of discharges which continues indefinitely.

A site may be turned off by applying an appropriate "erase" pulse (not shown) which has the effect of reducing the wall voltage to a level insufficient to reinforce the reversed sustaining voltage to produce a discharge pulse. The sequence of discharge pulses is accompanied by a sequence of light pulses (also not shown). The repetition rate of the light pulses is fast enough so that the light appears steady to the human eye. A typical sustaining voltage frequency is in the range 30–50 kHz. The magnitude of the sustaining voltage must be kept within a certain range, the bistable range. If the sustaining voltage is too low, the discharge sequence will not be maintained. If the sustaining voltage is too high, discharge sites will be turned on by the sustaining voltage alone, thus negating the ability to address selected points on the *x-y* matrix by the application of a write pulse. The memory of the panel is a consequence of the charges stored on the insulating surfaces. For a given display panel, the limits of the bistable range depend on many parameters such as the composition of the fill gas, the gas pressure, the panel geometry and panel materials.

Typically, periodic sustaining voltage sufficient to operate the panel is applied to the opposing electrode arrays, the wave form being rectangular, square, sinuosidal, trapezoidal, triangular, or of any other periodic geometric form or shape. As described in U.S. Pat. No. 3,727, 102 issued to William E. Johnson on Apr. 10, 1973, one half of the sustaining voltage can be applied to one electrode array and the other half can be applied at 180° phase or opposite polarity to the opposing electrode array, the two applied sustaining voltages being algebraically added across the unit. Likewise, all of the sustaining voltage can be applied to only one electrode array.

In the operation of a multiple gas discharge display/memory device which contains opposing electrode arrays, the writing of a particular unit or cell is usually effected by applying a writing voltage to one electrode of the cell and a similar writing voltage to the opposing electrode of the cell. The phase of each writing voltage is such that the two voltages are algebraically added to form a write pulse of sufficient magnitude to turn on the cell. The write voltages are known as partial select voltages. If the writing voltages are derived from the same source, each is equal to the other in magnitude and therefore represents one half of the write pulse. Such write voltages are known as half select voltages. U.S. Pat. No. 3,618,071 issued to William E. Johnson and Larry J. Schmersal on Nov. 2, 1971 discloses a circuit and method for generating partial select voltages to form write pulses.

U.S. Pat. No. 3,801,861 issued to William D. Petty and David E. Liddle on Apr. 2, 1974 discloses wave forms for operating a multiple gaseous discharge panel so as to minimize or eliminate the writing of not-to-be-written cells. One partial select voltage is applied to one electrode of a cell and another partial select voltage is applied to the opposing electrode wherein they are algebraically added across the cell from a near zero slope pedestal. The magnitude of the pedestal is substantially less than the maximum magnitude achieved by the total applied sustaining voltage on one period, and the magnitude of the partial select voltage applied to either opposing electrode alone is insufficient to write any cell in the panel.

It is desirous to increase the operating characteristics uniformity and operating life span of a gaseous discharge device. It has been found that such results can be obtained by utilizing a charge storage member with a low operating voltage gas medium contact surface consisting of at least one member selected from the oxides of Be, Mg, Ca, Sr, Ba or Ra as disclosed in U.S. Pat. No. 3,846,171 issued to Bernard W. Byrum, Jr. et al on Nov. 5, 1974 and U.S. Pat, No. 3,863,098 issued to Roger E. Ernsthausen on Jan. 28, 1975, both patents incorporated herein by reference.

One reason for the increase in the operating life span is a substantial reduction in the magnitudes of the operating voltages required to drive the panel. However, it has been found that use of a Group IIA oxide as the gas medium contact surface has a tendency to generate "crosstalk", when a selected cell is being turned on. Crosstalk refers to the turning on of cells adjacent the selected cell when only the selected cell is subjected to the write pulse. The present invention is directed to eliminating crosstalk by utilizing a slow rise time write pulse in place of the sharply defined write pulse of FIG. 1.

Figure 2:
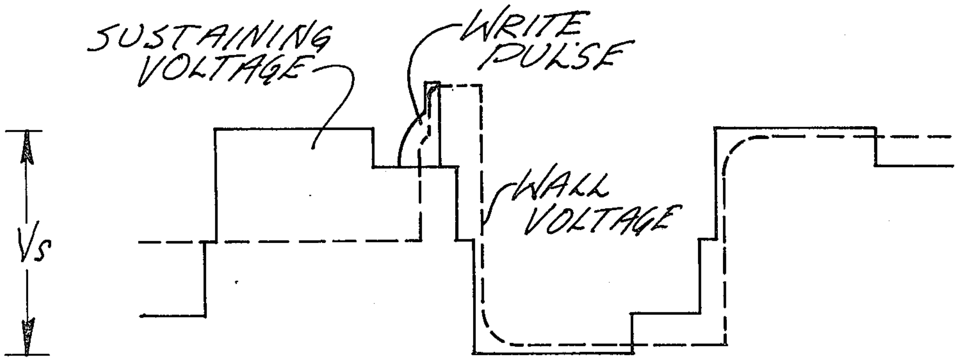
FIG. 2 is a modified sustaining voltage wave form and write pulse according to the present invention plotted against time.

There is shown in FIG. 2 the wave forms associated with the operating voltage applied to a gas discharge cell having at least one gaseous medium contacting surface which consists of a Group IIA oxide. The general shape of the sustaining voltage wave form is similar to the sustaining voltage shown in FIG. 1, but the magnitude is substantially less. The write pulse has a slow rise time designed to eliminate crosstalk. The circuitry for generating the slow rise time write pulse is well known in the art and can use the natural capacitive impedance of the cells and associated circuits to advantage. This circuit will be discussed subsequently after a general discussion of the panel construction and operation.

As illustrated in FIGS. 3 through 6, the Baker et al device utilizes a pair of dielectric films 31 and 32 separated by a thin layer or volume of a gaseous discharge medium 33. The medium 33 produces a copious supply of charges (ions and electrons) which are alternately collectable on the surfaces of the dielectric members at opposed or facing elemental or discrete areas X and Y defined by the electrode matrix on non-gas-contacting sides of the dielectric members, each dielectric member presenting large open surface areas and a plurality of pairs of elemental X and Y areas. While the electrically operative structural members such as the dielectric members 31 and 32 and a pair of electrode matrixes 34 and 35 are all relatively thin (being exaggerated in thickness in the drawings) they are formed on and supported by a pair of rigid nonconductive support members 36 and 37 respectively.

Preferably, one or both of the nonconductive support members 36 and 37 pass light produced by discharge in the elemental gas volumes. Typically, they are transparent glass members and these members essentially define the overall thickness and strength of the panel. For example, the thickness of the gas layer 33 as determined by a spacer 38 is usually under 10 mils for operation in the memory mode, the dielectric layers 31 and 32 (over the electrodes at the elemental or discrete X and Y areas) are usually between 1 and 2 mils thick, and the electrodes 31 and 32 about 8,000 angstroms thick,. However, the support members 36 and 37 are much thicker (particularly in larger panels) so as to provide as much ruggedness as may be desired to compensate for streses in the panel. The support members 36 and 37 also serve as heat sinks for heat generated by discharges and thus minimize the effect of temperature on operation of the device.

Except for being nonconductive or good insulators, the electrical properties of the support members 36 and 37 are not critical. The main function of the support members 36 and 37 is to provide mechanical support and strength for the entire panel, particularly with respect to pressure differential acting on the panel and thermal shock. It is noted that they should have thermal expansion characteristics substantially matching the thermal expansion characteristics of the dielectric layers 31 and 32. Ordinary ¼inches commercial grade soda lime plate glasses have been used for this purpose. Other glasses such as low expansion glasses or tranparent devitrified glasses can be used provided they can withstand processing and have expansion characteristics substantially matching expansion characteristics of the dielectric coatings 31 and 32. For given pressure differentials and thickness of plates, the stress and deflection of plates maybe determined by following standard stress and strain formulas (see R. J. Roark, *Formulas for Stress and Strain,* McGraw-Hill, 1954).

The spacer 38 may be made of the same glass material as the dielectric films 31 and 32 and may be an integral rib formed on one of the dielectric members and fused to the other members to form a bakeable hermetic seal enclosing and confining the ionizable gas volume 33. However, a separate final hermetic seal may be effected by a high strength devitrified glass sealant 39. A tubulation 41 is provided for exhausting the space between the dielectric member 31 and 32 and filling that space with the volume of ionizable gas. For large panels, small beadlike solder glass spacers, such as shown at 42, may be located between conductor intersections and fused to the dielectric members 31 and 32 to aid in withstanding stress on the panel and maintain uniformity of thickness of the gas volume 33.

The electrode arrays 34 and 35 may be formed on the support members 6 and 37 by a number of well-known processes, such as photoetching, vacuum deposition, stencil screening, etc. In the panel shown in FIG. 6, the center-to-center spacing of the electrodes in the respective arrays is about 17 mils. Transparent or semi-transpatent conductive material such as tin oxide, gold, or aluminum can be used to form the electrode arrays and should have a resistance less than 3000 ohms per line. Narrow opaque electrodes may alternatively be used so that discharge light passes around the edges of the electrodes to the viewer. It is important to select an electrode material that is not attacked during processing by the dielectric material.

It will be appreciated that the electrode arrays 34 and 35 may be wires or filaments of copper, gold, silver or aluminum or any other conductive metal or material. For example, 1 mil wire filaments are commercially available and may be used in the invention. However, formed in situ electrode arrays are preferred since they may be more easily and uniformly placed on and adhered to the support plates 36 and 37.

The dielectric layer members 31 and 32 are formed on an inorganic material and are preferably formed in situ as an adherent film or coating which is not chemically or physically affected during bake-out of the panel. One such material is a solder glass such as Kimble SG-68 manufactured by and commercially available from the assignee of the present invention.

This glass has thermal expansion characteristics substantially matching the thermal expansion characteristics of certain soda-lime glasses, and can be used as the dielectric layer when the support members 36 and 37 are soda-lime glass plates. The layers layers 31 and 32 must be smooth and have a dielectric breakdown voltage of about 1000v. and be electrically homogeneous on a microscopic scale (e.g., no cracks, bubbles, crystals, dirt, surface films, etc.). In addition, the surfaces of the dielectric lauers 31 and 32 should be good photoemitters of electrons in a baked out condition. Alternatively, the dielectric layers 31 and 32 may be overcoated with materials designed to produce good electron emission, as in U.S. Pat. No. 3,634,719, issued to Roger E. Ernsthausen. Of course, for an optical display at least one of the dielectric layers 31 and 32 should pass light generated on discharge and be transparent or translucent and, preferably, both layers are optically transparent.

The preferred spacing between surfaces of the dielectric films is about 4 to 8 mils with the electrode arrays 34 and 35 having center-to-center spacing of about 17 mils. The ends of the electrodes 35-1 through 35-4 and the support member 37 extend beyond the enclosed gas volume 33 and are exposed for the purpose of making electrical connection to an interface and addressing circuit 43. Likewise, the ends of the electrodes 34-1 through 34-4 on the support member 36 extend beyond the enclosed gas volume 33 and are exposed for the purpose of making electrical connection to interface and addressing circuit 43.

The bistable mode of initiating operation of the panel will be described with reference to FIG. 5, which illustrates the condition of one elemental gas volume 44 having an elemental cross-sectional area and volume which is quite small relative to the entire volume 44. The area is defined by the overlapping common elemental areas of the electrode arrays and the volume is equal to the product of the distance between the dielectric surfaces and the elemental area. It is apparent that if the electrode arrays are uniform and linear and are orthogonally (at right angles to each other) related, each of elemental areas X and Y will be squares and if the electrodes of one electrode array are wider than the electrodes of the other electrode array, said areas will be rectangles. If the electrode arrays are at transverse angles relative to each other, other than 90°, the areas will be diamond shaped so that the cross-sectional shape of each volume is determined solely in the first instance by the shape of the common area of overlap between the electrodes in the electrode arrays 34 and 35. The dotted lines 44′ are imaginary lines to show a boundary of one elemental volume about the center of which each elemental discharged takes place. As described earlier herein, it is known that the cross-sectional area of the discharge in a gas is affected by, inter alia, the pressure of the gas, such that, if desired, the discharge may even be constricted to within an area smaller than the area of electrode overlap. By utilization of this phenomenon, the light production may be confined or resolved substantially to the area of the elemental cross-sectional area defined by the electrode overlap. Moreover, by operating at such pressure, charges (ions and electrons) produced on discharge are laterally confined so as not materially to affect operation of adjacent elemental discharge volumes.

In the instant shown in FIG. 5, a conditioning discharge about the center of the elemental volume 44 has been initiated by application to the electrode 34-1 and the electrode 35-1 firing potential V*x*' as derived from a source 45 of variable phase, for example, and source 46 of sustaining potential V*x* (which may be a sine wave, for example) the potential V*x*' is superimposed on the sustaining potential V*s* as the sustaining potential V*s* increases in magnitude to initiate the conditioning discharge about the center of the elemental volume 44. There, the phase of the source 45 of potential V*x*' has been adjusted into adding relation to the alternating voltage from the source 46 of the sustaining voltage V*s* to provide a voltage V*f*, when a switch 47 has been eclosed, the electrodes 34-1 and 35-1 defining the elemental gas volume 44 sufficient (in time and/or magnitude) to produce a light generating discharge centered about the discrete elemental gas volume 44. At the instant shown, since electrode 34-1 is at a positive potential, a plurality of electrons 48 have collected on and are moving to an elemental area of the dielectric member 31 substantially corresponding to the area of the elemental gas volume 44 and a plurality of the less mobile positive ions 49 are beginning to collect on the opposed elemental area of the dielectric member 32 since it is at negative potential. As these charges build up, they constitute a back voltage opposed to the voltage applied to the electrodes 34-1 and 35-1 and serve to terminate the discharge in the elemental gas volume 44 for the remainder of a half cycle.

During the discharge about the center of the elemental gas volume 44, photons are produced which are free to move to pass through the gas medium 33 as indicated by a plurality of arrows 51, to strike or impact remote surface areas of the photoemissive dielectric members 31 and 32, causing such remote areas to release a plurality of electrons 52. The electrons 52 are, in effect, free electrons in the gas medium 33 and condition other discrete elemental gas volumes for operation at a lower firing potential V*f* which is lower in magnitude than the firing potential V*f* for the initial discharge about the center of the elemental volume 44. This voltage is substantially uniform for each other elemental gas volume.

Thus, elimination of the physical obstructions or barriers between discrete elemental volumes permits photons to travel via the space occupied by the gas medium 33 to impact remote surface areas of the dielectric members 31 and 32 and provides a mechanism for supplying free electrons to all elemental gas volumes. These free electrons condition all discrete elemental gas volumes for subsequent discharges, respectively, at a uniform lower applied potential. While in FIG. 5 a single elemental volume 44 is shown, it will be appreciated that an entire row (or column) of elemental gas volumes may be maintained in a "fired" condition during normal operation of the device with the light produced thereby being masked or blocked off from the normal viewing area and not used for display purposes. it can be expected that in some applications there will always be at least one elemental volume in a "fired" condition and producing light in a panel, and in such applications it is not necessary to provide separate discharge or generation of photons for purposes described earlier.

The prior art has taught that the entire gas volume can be conditioned for operation at uniform firing potentials by use of externnal or internal radiation so that there will be no need for a separate source of higher potential for initiating an initial discharge. Thus, by irradiating the panel with ultraviolet radiation or by inclusion of a radioactive material within the glass materials or gas space, add discharge volumes can be operated at uniform potentials from the addressing and interface circuit 43.

Since each discharge is terminated upon a build up or storage of charges at opposed pairs of elemental area, the light produced is likewise terminated. In fact, light production lasts for only a small fraction of a half cycle of applied alternating potential and depending on design parameters, is in the microsecond range.

After the initial firing or discharge of the discrete elemental gas volume 44 by a firing potential V*f*, the switch 47 may be opened so that only the sustaining voltage Vs from the source 46 is applied to the electrodes 34-1 and 35-1. Due to the storage of the charges (e.g., the memory) at the opposed elemental areas X and Y, the elemental gas volume 44 will discharge again at or near the peak of the negative half cycles of the sustaining voltage V*s* to again produce a momentary pulse of light. At this time, due to the reversal of field direction, the electrons 48 will collect on and be stored on the elemental surface area Y of the dielectric member 32 and the positive ions 49 will collect and be stored on the elemental surface area X of the dielectric member 31. After a few cycles of the sustaining voltage V*s*, the times of discharges become symmetrically located with respect to the wave form of the sustaining voltage. At the remote elemental volumes, as for example, the elemental volumes defined by the electrodes 35-1 with the electrodes 34-2 and 34-3, a unifform magnitude or potential V*x* from a source 53 is selectively superimposed by one or both of a pair of switches 54 or 55 to the sustaining voltage V*s*, generated by a voltage source 56, to fire one or both of these elemental discharge volumes. Due to the presence of free electrons produced as a result of the discharge centered about the elemental volume 44, each of these remote discrete elemental volumes has been conditioned for operation at uniform firing potential V*f*.

It is apparent that the plates 36 and 37 need not be flat but may be curved, the curvature of facing surfaces of each plate being complementary to each other. While the preferred conductor arrangement is of the crossed grid type as shown herein, it is likewise apparent that where an infinite variety of two dimensional display patterns are not necessary, as where specific standardized visual shapes (e.g., numerals, letters, words, etc.) are to be formed and image resolution is not critical, the conductors may be shaped accordingly.

The devise shown in FIG. 6 is a panel having a large number of elemental volumes similar to the elemental volume 44 of FIG. 5. In this case more room is provided to make electrical connection to the electrode arrays 34' and 35', respectively, by extending the surfaces of the support members 36' and 37' beyond the seal 39', alternate electrodes being extended on alternate sides. The electrode arrays 34' and 35' as well as the support members 36' and 37' are transparent. The dielectric coatings are not shown in FIG. 6 but are likewise transparent so that the panel may be viewed from either side. The panel can include red, green and blue phosphors associated with individual discharge cells as disclosed in U.S. Pat. No. 3,878,422 issued to F. H. Brown et al. and U.S. Pat. No. 3,909,657 isued to F. H. Brown. The panel can be of monolithic design as disclosed in U.S. Pat. No. 3,896,327 issued to J. S. Schermerhorn.

The support members, the dielectric members, and the dielectric coatings on one side or half of the panel may be dark and/or opaque in order to improve the viewing light contrast on the opposite side of the panel. Reference is made to U.S. Pat. No. 3,686,686 issued to M. S. Hall and incorporated herein by reference.

A wide variety of gases and gas mixtures have been utilized as the gaseous medium in a gas discharge device. Typical of such gases include CO; $CO_2$; halogens; nitrogen; $NH_3$; oxygen; water vapor; hydrogen; hydrocarbons; $P_2O_5$; boron fluoride; acid fumes; $TiCl_4$; air; $H_2O_2$; vapors of sodium, mercury thallium, cadmium, rubiduem, and cesium; carbon disulfide; $H_2S$; deoxygenated air; phosphorus vapors; $C_2H_2$; $CH_4$; naphthalene vapor; anthracene; freon; ethyl alcohol; methylene bromide; heavy hydrogen; electron attaching gases; sulfur hexafluoride; tritium; radioactive gases; the rare or inert gases; and mixtures thereof.

Figure 3:
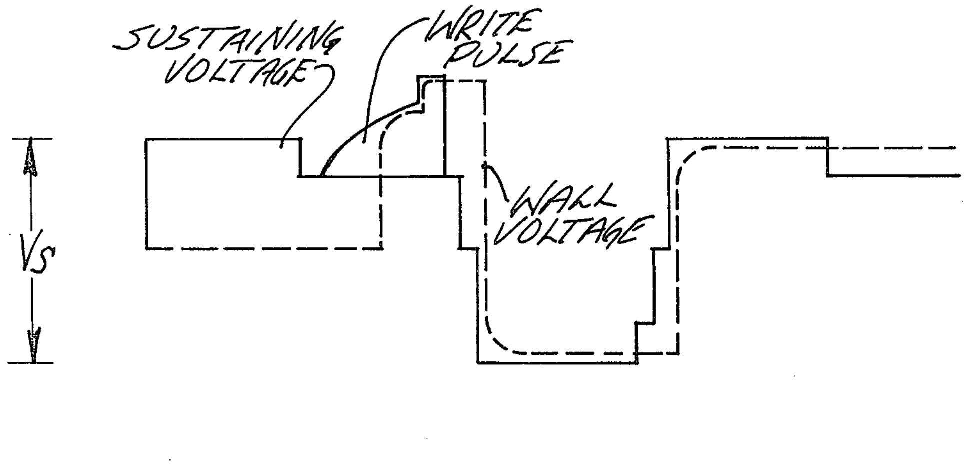
FIG. 3 is a partially cut-away plan view of a gaseous discharge display/memory panel of the Baker et al type, disclosed in U.S. Pat. No. 3,499,167, connected to a diagrammatically illustrated source of operating potentials.
Figure 3:
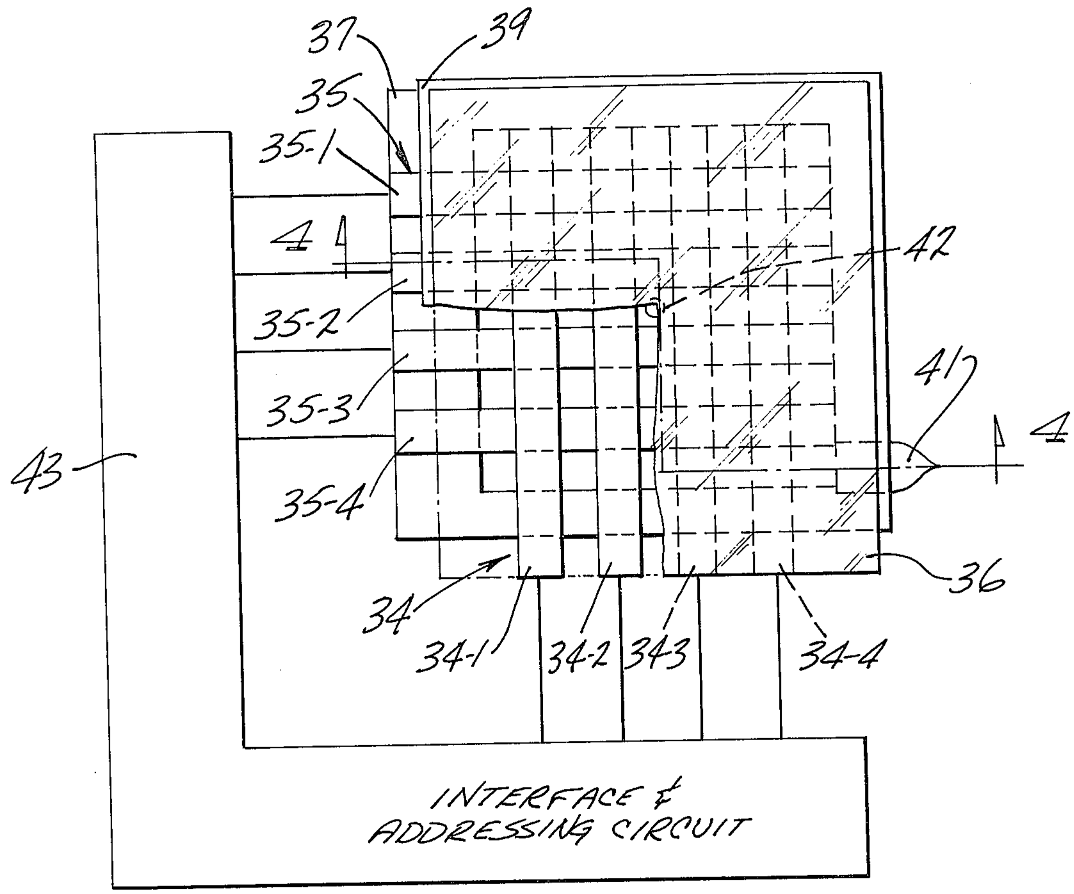
Figure 4:
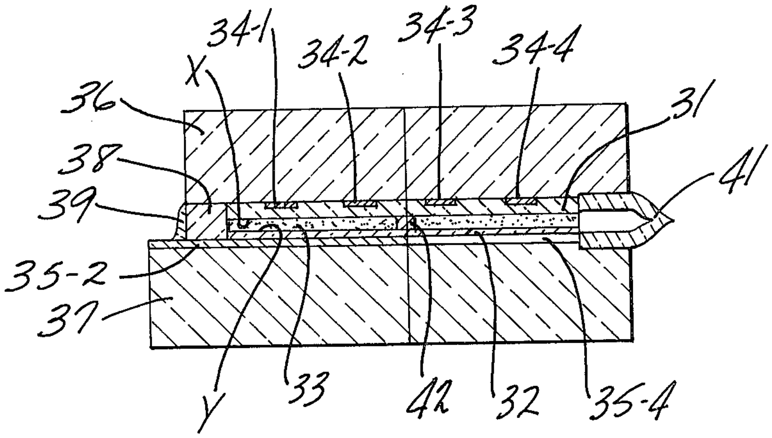
FIG. 4 is a cross-sectional view (enlarged, but not to proportional scale since the thickness of the gas volume, dielectric members and electrode arrays have been enlarged for purposes of illustration) taken on lines 4—4 of FIG. 3.

It is known in the art that the interface and addressing circuit 43 of FIG. 3 may be the relatively inexpensive line scan systems or the somewhat more expensive high speed random access systems. In either case, it is to be noted that a lower magnitude of operating potentials helps to reduce problems associated with the interface circuitry between the addressing system and the display/memory panel. Thus, by providing a panel having a greater uniformity in the discharge characteristics throughout the panel, tolerances and operating characteristics of the panel with which the interface circuitry cooperates, are made less rigid.

The interface and addressing circuit 43 of FIG. 3 is represented schematically in FIG. 7 as a circuit for driving a single column electrode 34-1 and a single row electrode 35-4 whose intersection defines a single cell or discharge site. The electrodes are connected to a diode-resistor matrix for selecting individual column electrodes and individual row electrodes to write and erase selected cells. A pair of sustainer voltage sources are connected between the electrode arrays and the circuit ground potential to supply the sustainer voltage to the cell.

A row sustainer voltage source 61 is connected to the row electrode 35-4 and all other row electrodes (not shown) through a plurality of diodes such as a feed through diode 62 having an anode connected to the voltage source 61 and a cathode connected to the electrode 35-4. A column sustainer voltage source 63 is connected to the column electrode 34-1 and all other column electrodes (not shown) through a plurality of diodes such as a feed through diode 64 having a cathode connected to the voltage source 63 and an anode connected to the electrode 34-1.

A plurality of pulser voltage generators are utilized to address the individual electrodes. A row diode pulser P (RD) 65 and a row resistor pulser P (RR) 66 are connected in parallel with the diode 62 between the row sustainer voltage source 61 and the row electrode 35-4. A row diode 67 has an anode connected to the electrode 35-4 and a cathode connected to the pulser 65. A row resistor 68 is connected between the pulser 66 and the electrode 35-4. The pulser-dioderesistor circuit for the column electrode 34-1 is similar. A column diode pulser P (CD) 69 and a column resistor pulser P (CR) 71 are connected in parallel with the diode 64 between the column sustainer voltage source 63 and the column electrode 34-1. A column diode 72 has an anode connected to the pulser 69 and a cathode connected to the electrode 34-1. A column resistor 73 is connected between the pulser 71 and the electrode 34-1. Since the pulser are connected in series with the sustainer voltage sources between the electrodes and a ground connection 74, the pulser wave forms will float on the sustainer voltage wave forms and will be referenced from the composite sustainer wave form V*s* of FIGS. 1 and 2. If the electrode 35-4 is selected for writing or erasing, the pulser 66 is turned on to generate a voltage pulse and the pulser 65 is turned off to block the voltage pulse from returning through the puler 65. Furthermore, the resistor and diode pulsers may each be connected to more than one electrode through associated resistors and diodes, but each pair of resistor and diode pulsers are connected to only one common electrode. The diode pulsers connected to electrodes which have not been selected but have an applied pulse voltage are turned on to provide a current path back to the resistor pulser.

There is also shown in FIG. 7 a pair of pulsers, a row keyer pulser 75 P (RK) common to all row electrodes and a column keyer pulser 76 P (CK) common to all column electrodes. The row keyer pulser 75 is connected in series with a resistor 77 and a diode 79 in parallel with the row diode pulser 65. The column keyer pulser 76 is connected in series with a resistor 78 and a diode 80 in parallel with the colunn diode pulser 69. The row keyer pulser 75 is connected through a plurality of resistors and diodes to the row pulsers for each of the other row electrodes and the column keyer pulser 76 is connected in a similar manner to all of the other column electrodes. The keyer pulser voltage wave forms will float on the sustainer voltage wave forms and will be referenced from the composite sustainer wave form V*s* of FIGS. 1 and 2.

The sustainer voltage sources 61 and 63 generate voltages which are 180° out of phase so that each source need supply only one half of the sustainer voltage V*s* required to sustain discharges at a selected cell. The voltage sources 61 and 63 continuously generate the V*s*/2 and V*s* (180°)/2 voltages to the row and column electrodes. These voltages are periodic and can be for example sinusoidal, trapizoidal, square wave (as shown in FIG. 1 and 2) or triangular. The sustainer wave forms can also be asymmetric as disclosed in U.S. Pat. No. 3,840,779 issued to Jerry D. Schermerhorn on Oct. 8, 1974. The sustainer voltage is passed through the diode pulsers 65 and 69 such that the diodes 62 and 64 provide a current path for one polarity of the sustainer voltage and the diodes 67 and 72 provide a current path for the other polarity of the sustainer voltage such that the sustainer voltage is applied across the cell.

As disclosed in the previously referenced U.S. Pat. No. 3,727,102, the pulsers 65, 66, 69 and 71 are utilized to generate the write and erase pulses for turning on and off respectively the cell defined at the intersection of the electrodes 34-1 and 35-4. If the sustaining voltage source 71 is generating a positive polarity wave form with respect to the circuit ground potential and the source 63 is generating a negative potential wave form, the charging current for the cell is flowing through the diodes 62 and 64. The pulsers 65 and 66 generate a negative polarity wave form with respect to the circuit ground potential and the pulsers 69 and 61 generate a positive wave form to generate an erase pulse which has a polarity opposite that of the sustaining voltage. If the sources 61 and 63 are generating ground and positive polarity wave forms respectively, then the pulse generated by the pulsers will be a write pulse since it has the same polarity as the sustaining voltage.

The natural capacitance of the discharge cells and the associated circuitry tends to soften the leading edge of the write and erase pulses. This effect is undesirable where a relatively rapid succession of writing and erasing operations must be performed. Therefore, the row keyer pulser 75 and the column keyer pulser 76 were added to the resistor-diode matrix to improve the rise time of the leading edge of the write and erase pulses. They are connected in parallel to all the row electrodes and column electrodes so that only one pair is required. Where the panel includes a relatively large number of electrodes, more than one pair of keyer pulsers may be required with each one connected to a separate group of electrodes. The keyer pulsers are turned on at the same time that the other pulsers are turned on to generate the steeply rising leading edge shown in the write pulse of FIG. 1. The keyer pulsers are then turned off and when the other pulsers are turned off, the cell rapidly discharges through the diodes to generate the steeply falling trailing edge of the write and erase pulses.

Where a Group IIA oxide has been utilized as the gaseous medium contacting surface to lower the operating potential required, it has been found that the steeply rising leading edge of the write pulse of FIG. 1 generates "crosstalk". That is, the write pulse not only turns on the selected cell, but also frequently turns on one or more adjacent cells. In accordance with the present invention, the keyer pulsers 75 and 76 are turned off during an initial portion of the generation of the write pulses but not during the generation of the erase pulses. Such operations of the interface and addressing circit 43 and the capacitance of the selected cell generate a slow rise time write pulse as shown in FIG. 2.. The slow rise time write pulse reduces crosstalk and results in improved operation of the panel.

The operation of the panel can be further improved by increasing the duration of the write pulse thereby decreasing the slope of the leading edge. U.S. Patent application Ser. No. 546,241 filed on Feb. 3, 1975 in the name of John W. V. Miller and incorporated herein by reference, discloses a method and apparatus for altering the sustainer voltage wave form during addressing to provide longer intervals for the transfer of addressed cells between an "on state" and an "off state" of discharge. Sustainer wave forms allow more time for "turn on" and "turn off" partial select signals to be effective by extending the sustainer wave form pedestals on which the partial selects are imposed. These sustainer alternations can be performed by extending the sustainer periods in which addressing is performed or by maintaining the sustainer periods and shortening those portions of the period which are not utilized for addressing as by employing only a "write" pedestal or only an "erase" pedestal. This latter technique is illustrated in FIG. 8 which shows a shortened non-addressing erase pedestal and an increased duration slow rise time write pulse superimposed on a lengthened write pedestal.

Figure 9:
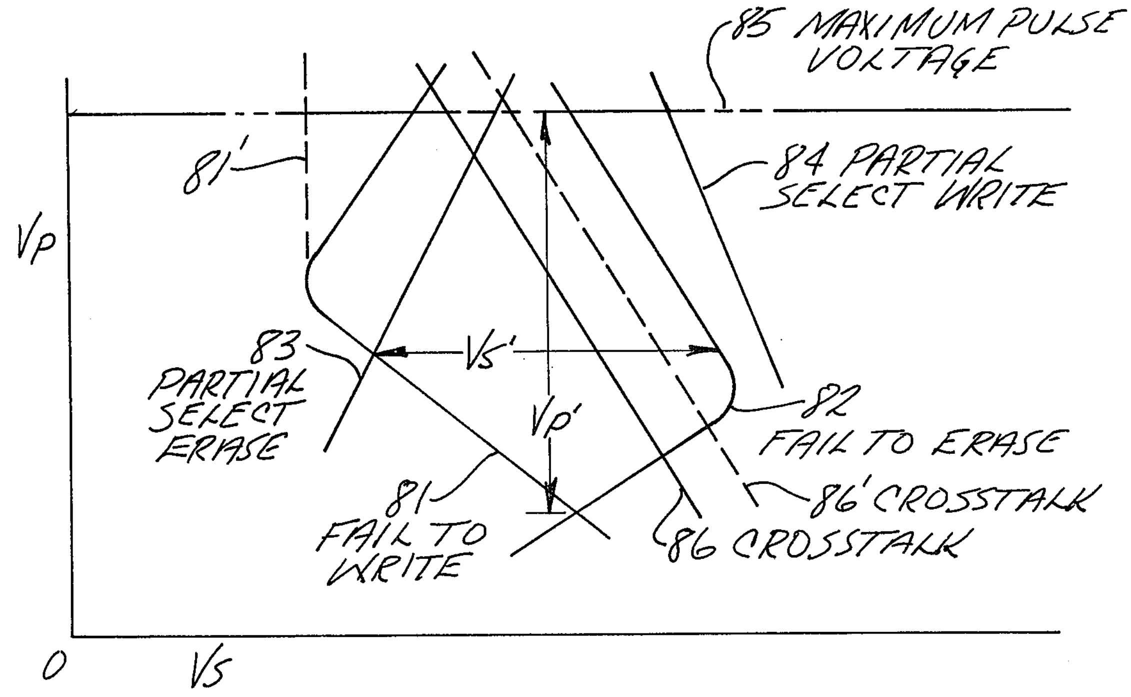
FIG. 9 is a plot of the window data for a typical gaseous discharge panel.

FIG. 9 shows the window data for a typical gaseous discharge panel plotted as write and erase pulse voltage $V_p$ against sustainer voltage $V_s$. A first hyperbolic-like curve 81 defines the range of pulse voltages versus sustainer voltages for writing the cells in the panel. The area to the left of the curve represents the combinations of write pulse voltage and sustainer voltage for which at least one cell in the panel will fail to write (not turn on) while the area to the right of the curve represents combinations for which all cells will write. If a combination falls in the area to the lower left of the curve 81, the magnitude of the write pulse for a given sustainer voltage is insufficient to initiate a discharge in one or more of the cells. Therefore, the magnitude of the write pulse voltage must be increased to generate a combination to the right of the fail to write curve 81. If the combination falls in the area to the upper left of the curve 81, the magnitude of the write pulse for a given sustainer voltage is sufficient to turn on one or more cells so hard that the wall charge which is formed is unstable and the cell turns itself off. Therefore, the magnitude of the write pulse voltage must be decreased to generate a combination to the right of the fail to write curve 81.

A second hyperbolic-like curve 82 defines the range of pulse voltages versus sustainer voltages for erasing the cells in the panel. The area of the right of the curve represents the combinations of erase pulse voltage and sustainer voltage for which at least one cell in the panel will fail to erase (not turn off) while the area to the left of the curve represents combinations for which all the cells will erase. If a combination falls in the area to the lower right of the curve 82, the magnitude of the erase pulse for a given sustainer voltage is insufficient to discharge the wall charge to turn off one or more of the cells. Therefore, the magnitude of the erase pulse must be increased to generate a combination to the left of the fail to erase curve 82. If a combination falls in the area to the upper right of the curve 82, the magnitude of the erase pulse for a given sustainer voltage is sufficient not only to discharge the wall charge but develop an opposite wall charge to maintain one or more cells in the on state. Therefore, the magnitude of the erase pulse must be decreased to generate a combination to the left of the fail to erase curve 82.

Also shown in FIG. 9 is a partial select erase line 83 and a partial select write line 84. The partial select erase line 83 defines combinations of a partial select erase pulse and a sustainer voltage which will turn off at least one cell in the panel to which only the one partial select erase pulse has been applied. Similarly, the partial select write line 84 defines combinations of a partial select write pulse and sustainer voltage which will turn on at least one cell in the panel to which only the one partial select write pulse has been applied. A maximum pulse voltage line 85 defines the upper voltage limit of the electronics which generate the write and erase pulses. The relative positions of the curves 81 and 82 and the lines 83, 84 and 85 form a window which contains all the permissible combinations of pulse voltage and sustainer voltage which will operate all the cells of the panel. The maximum vertical and horizontal dimensions of the window are an indication of the tolerance of the panel to variations from the desired optimum operating pulse and sustainer voltages.

As shown in FIG. 9 for a typical panel, the maximum vertical dimension $V_p'$ is defined by the maximum pulse voltage line 85 and the intersection of the fail to write curve 81 and the fail to erase curve 82. The maximum horizontal dimension $V_s'$ is defined by the fail to erase curve 82 and the intersection of the fail to write curve 81 and the partial select erase line 83. It is desirable to have a relatively large window so that less expensive, wider tolerance electronics can be utilized to generate the pulse and sustainer voltages. However, the useful window is reduced by "crosstalk" shown as a line 86.

When the write pulse of FIG. 1 is used, only that portion of the window to the left of the line 86 can be utilized without generating "crosstalk" in cells adjacent to the selected cell.

When the slow rise time portion write pulse of FIG. 8 is used however, the crosstalk line 86 is shifted to the right as shown in FIG. 9 by a dashed line 86'. This shift increases the size of the useful portion of the window. The slow rise time pulse also generates an additional benefit. The upper portion of the write curve 81 is modified to be more nearly vertical (shown as dashed line 81') and the curve is shifted to the left to increase the size of the window. The partial select write line 84 is also shifted to the left but does not enter into the definition of the boundaries of the window unless it crosses the fail to erase curve 82.

The interface and addressing circuit 43 includes a sustainer voltage source control means 91, a keyer pulser control means 92, a diode and resistor pulser control means 93 and an addressing means 94 shown in FIG. 7. The sustainer control means 92 enables the sustainer voltage sources 61 and 63 to apply the sustainer voltage to all of the cells in the panel. The addressing means 94 receives information from an external source which can be, for example, a computer, a tape reader or a keyboard. The addressing means 94 then determines which cells are to be written or erased and sends control signals to the keyer pulser control means 92 and the diode and resistor pulser control means 93. If the cell defined by the crossing of the electrodes 34-1 and 35-4 is to be turned on, the control means 92 and 93 sense the timing of the sustainer control means for generating a write pulse. The control means 92 turns off the keyer pulsers 75 and 76 and the control means 93 turns on the pulsers 65, 66, 69 and 71. After a predetermined period of time, but before the resistor pulsers are turned off, the keyer pulsers are turned on to generate a relatively fast rise time leading edge portion of the write pulse. If the cell is to be turned off, the control means 92 turns on the keyer pulsers and the control means 93 turns on the resistor and diode pulsers to generate an erase pulse.

In summary, the present invention concerns a method and apparatus for generating a write pulse having a relatively slow rise time leading edge. The write pulse is applied to a multicelled gas discharge display/memory device having a dielectric charge storage member formed from a low operating voltage material for improved operation of the device.

The device includes a pair of opposed electrode arrays with proximate electrode portions of at least one electrode in each array defining the cells. An ionizable gas volume is contained between the spaced electrode arrays and a dielectric charge storage member in contact with the gas insulates at least one electrode portion of each cell from the gas. The dielectric charge storage member is formed from a low operating voltage material such as an oxide of a Group IIA element.

A sustainer voltage source is connected across each cell to impose an alternating voltage having a period. During a period, the sustainer wave form has a first voltage of a first polarity and a second voltage of a second polarity with a magnitude and duration sufficient to maintain a discharge in any cell which is in the "on state". Also included is a pulser means for generating write and erase voltage pulses to mainipulate the discharge state of individual cells between the "on state" and an "off state".

The write pulse has a relatively slow rise time leading edge and the erase pulse has a relatively fast rise time leading edge. The sustainer voltage source generates a third sustainer voltage of the first polarity between the first and second voltages of the same period having a magnitude and duration, when added to the write pulse, sufficient to turn any cell in the "off state" to the "on state". Typically, the duration of the first sustainer voltage is greater than the duration of the third sustainer voltage and the duration of the leading edge of the write pulse approaches the duration of the third sustainer voltage. The sustainer source also generates of fourth sustainer voltage of the second polarity between the second and first voltages of succeeding periods having a magnitude and duration, when added to the erase voltage pulse, sufficient to turn any cell in the "on state" to the "off state".

A keyer pulser means is connected to the pulser means. An interface and addressing circuit controls the operation of the sustainer voltage source, the pulser means and the keyer pulser means. When an addressing means determines that a write cell is to be written, it sends control signals to a keyer pulser control means and a diode and resistor pulser control means. The control means sense the timing of a sustainer voltage source control means for generating a write pulse during the generation of the same polarity sustainer voltage. The keyer pulser means is turned off and the diode and resistor pulser means is turned on to generate the write pulse with a relatively slow rise time leading edge across a selected cell. After a predetermined period of time, the keyer pulser means is turned on to generate a relatively fast rise time portion of the write pulse to further improve the operation of the selected cell. When the addressing means determines that a cell is to be erased, it sends control signals to the control means for generating an erase pulse during the generation of the opposite polarity sustainer voltage. The keyer pulser means and the diode and resistor pulser means are turned on to generate the erase pulse with relatively fast rise time leading edge across a selected cell.

Therefore, the method of the present invention concerns manipulating the discharge state of individual cells of a gas discharge display/memory device. A periodic alternating polarity sustainer voltage is applied to a cell having a magnitude and duration sufficient to maintain a discharge if the cell is in the "on state". If the cell is in the "off state", it can be turned to the "on state" by turning on a pulser means connected across the cell and turning off a keyer pulser means connected across the cell to generate a write pulse having a relatively slow rise time leading edge. Then the keyer pulser means is turned on before the write pulse ends to generate a relatively fast rise time leading edge portion of the write pulse. If the cell is in the "on state", it can be turned to the "off state" by turning on the pulser means and the keyer pulser means to generate an erase pulse having a relatively fast rise time leading edge.

The sustainer wave form can be altered to allow more time for the "turn on" partial select signal by extending the write pedestal. This may be accomplished by extending the sustainer periods or by maintaining the sustainer periods and lengthening the write pedestal while shortening the erase pedestal. Thus the duration of third sustainer voltage is increased as can be the duration of the leading edge of the write voltage pulse while the duration of the fourth sustainer voltage is decreased In accordance with the provisions of the patent statutes, the principle and mode of operation of the present invention has been explained and what is considered to be its best embodiment has been illustrated and described. However, it is to be understood that the invention may be practiced otherwise than as specifically illustrated and described without departing from its spirit or scope.

What is claimed is:

1. In an operating system for a multicelled gas discharge display/memory device said device including a pair of opposed electrode arrays with proximate electrode portions of at least one electrode in each array defining the cells; an ionizable gas volume between the spaced electrode portions of each cell; a dielectric charge storage member in contact with th gas insulating at least one electrode portion of each cell from the gas; a sustainer voltage source connected across each cell to cyclically impose an alternating voltage having a period; and pulser means for generating write and erase voltage pulses to manipulate the discharge state of individual cells between an "on state" and an "off state"; and keyer pulser means for generating a steeply rising leading edge on the write and erase voltage pulses, the improvement comprising: said dielectric charge storage member formed from a low operating voltage material and means for turning off said keyer pulser means during the generation of a first portion of said write voltage pulses to form a relatively slow rise time leading edge on said write voltage pulses and turning on said keyer pulser means during the generation of a second portion of said write voltage pulses to form a relatively fast rise time leading edge on said write voltage pulses whereby crosstalk between adjacent cells is reduced.

2. A system according to claim 1 wherein said low operating voltage material is an oxide selected from the oxides of Group IIA elements.

3. A system according to claim 2 wherein said low operating voltage material is magnesium oxide.

4. A system according to claim 1 including capacitor means connected to the junction between said pulser means and said spaced electrode portions.

5. A system according to claim 1 wherein said sustainer voltage source generates a first sustainer voltage of a first polarity and a second sustainer voltage of a second polarity having a magnitude and duration during each sustainer period sufficient to maintain a discharge in any cell which is in the "on state" and generates a third sustainer voltage of said first polarity between said first and second voltages of the same period having a sloped portion with a magnitude and duration, when added to said write voltage pulse, sufficient to turn any cell in the "off state" to the "on state".

6. A system according to claim 5 wherein said sustainer voltage source generates a fourth sustainer voltage of said second polarity between said second and first voltages of succeeding periods having a magnitude and duration, when added to said erase voltage pulse, sufficient to turn any cell in the "on state" to the "off state".

7. A system according to claim 5 wherein the duration of said fourth sustainer voltage is less than the duration of said third sustainer voltage.

8. A system according to claim 7 wherein the duration of the leading edge of said write pulse approaches the duration of said third sustainer voltage.

9. A circuit for operating a gas discharge display memory device having a plurality of cells, said device including a pair of opposed electrode arrays with proximate electrode portions of at least one electrode in each array defining the cells; an ionizable gas volume between the spaced electrode portions of each cell; and a dielectric charge storage member having a low operating voltage surface in contact with the gas insulating at least one electrode portion of each cell from the gas, said circuit comprising:

a sustainer voltage source connected between said opposed electrodes for applying an alternating voltage wave form to said cells;

a pulser means connected in series with said sustainer voltage source for generating a write pulse having a relatively slow rise time leading edge first portion followed by a relatively fast rise time leading edge second portion and an erase pulse having a relatively fast rise time leading edge; and control and addressing means connected to said pulser means for selecting one of said cells and for directing said pulser means to apply said write pulse or said erase pulse to said selected cells.

10. A circuit according to claim 9 wherein said pulser means includes a resister pulser means and a keyer pulser means connected between said opposed electrodes and said control and addressing means turns off said keyer pulser means during said first portion and turns on said keyer pulser means during said second portion and turns on said resistor pulser means to generate said write pulse.

11. A circuit according to claim 10 wherein said control and addressing means turns on said keyer pulser means and said pulser means to generate said erase pulse.

12. A method of manipulating the discharge state of individual cells of a gas discharge display/memory device which comprises:

applying a periodic alternating polarity sustainer voltage to said cells having a magnitude and duration sufficient to maintain a discharge in any cell which is in the "on state";

turning a cell in the "off state" to the "on state" by applying a write pulse having a relatively slow rise time leading edge portion followed by a relatively fast rise time leading edge portion; and turning a cell in the "on state" to the "off state" by applying an erase pulse having a relatively fast rise time leading edge.

13. A method according to claim 12 wherein said step of turning a cell to the "on state" is performed by turning on a pulser means connected across said cell and turning off a keyer pulser means connected across said cell to generate said relatively slow rise time leading edge portion.

14. A method according to claim 13 wherein said step of turning a cell to the "on state" is performed by turning on said pulser means connected across said cell and turning on said keyer pulser means connected across said cell to generate said relatively fast rise time leading edge portion.

15. A method according to claim 12 wherein said step of turning a cell to the "off state" is performed by turning on a pulser means and a keyer pulser means connected across said cell.

* * * * *

UNITED STATES PATENT AND TRADEMARK OFFICE

CERTIFICATE OF CORRECTION

PATENT NO. : 4,087,807

DATED : May 2, 1978

INVENTOR(S) : Joseph L. Miavecz

It is certified that error appears in the above-identified patent and that said Letters Patent are hereby corrected as shown below:

Col. 2, line 32, "nor" should read - - not - - ;
line 64, "frequency" should read - - frequently - -;

Col. 3, line 38, after the initial quote mark and before the word "state" insert - - on - - .

Col. 4, line 25, "another" should read - - one - - .

Col. 5, line 43, after "cells" (second occurrence), insert - - and associated circuitry - - ;
line 44, "be" should read - - the - - .

Col. 6, line 7, "inventionis" should read - - invention is -.
line 42, after "2;" insert - - and - - .

Col. 8, line 3, "on" should read - - in - - .

UNITED STATES PATENT AND TRADEMARK OFFICE
CERTIFICATE OF CORRECTION

PATENT NO. : 4,087,807 Page 2 of 3

DATED : May 2, 1978

INVENTOR(S) : Joseph L. Miavecz

It is certified that error appears in the above-identified patent and that said Letters Patent are hereby corrected as shown below:

Col. 9, line 7, "streses" should read -- stresses --;
line 20, "1/4inches" should read -- 1/4 inches --;
line 22, "tranparent" should read -- transparent --.

Col. 10, line 1, "on" should read -- of --;
line 12, "layers" (first occurrence) should read -- dielectric --;
line 17, "lauers" should read -- layers --.

Col. 11, line 9, "Vx" should read -- Vs --;
line 36, "to" (second occurrence) should read -- or --;
line 44, "Vf" should read -- Vf' --;
line 61, "it" should read -- It --.

Col. 12, line 1, "externnal" should read -- external --;
line 6, "add" should read -- all --;
line 16, "Vf" should read -- Vf' --;
line 34, "unifform" should be -- uniform --;
line 36, "to" should be -- on --;

UNITED STATES PATENT AND TRADEMARK OFFICE

CERTIFICATE OF CORRECTION

PATENT NO. : 4,087,807

DATED : May 2, 1978

INVENTOR(S) : Joseph L. Miavecz

It is certified that error appears in the above-identified patent and that said Letters Patent are hereby corrected as shown below:

Col. 14, line 4, "pulser" should be -- pulsers --;
line 6, after "pulser" insert -- voltage --;
line 28, "colunn" should read -- column --;
line 44, "trapizoidal" should read -- trapezoidal --;
line 61, "negative" should read -- ground --.

Col. 15, line 34, "circit" should read -- circuit --.

Col. 17, line 66, "maninipulate" should read -- manipulate --.

Col. 18, line 22, delete "write".

Col. 19, line 4, "be" should read -- represent --;
line 16, (Claim 1), "th" should read -- the --;
line 20, (Claim 1), delete "and" (first occurrence);
line 51, (Claim 5), delete "a sloped portion with".

Col. 20, line 23, (Claim 9), "cells" should read -- cell --.

Signed and Sealed this

*Seventh* Day of *November 1978*

[SEAL]

*Attest:*

RUTH C. MASON
*Attesting Officer*

DONALD W. BANNER
*Commissioner of Patents and Trademarks*